(12) United States Patent
Mason et al.

(10) Patent No.: US 9,593,991 B2
(45) Date of Patent: Mar. 14, 2017

(54) PRINTED CIRCUITS WITH EMBEDDED STRAIN GAUGES

(71) Applicant: Apple Inc., Cupertino, CA (US)

(72) Inventors: Anne M. Mason, Palo Alto, CA (US); Bryan McDonald, Monte Sereno, CA (US); Shawn X. Arnold, San Jose, CA (US); Matthew Casebolt, Fremont, CA (US); Dennis R. Pyper, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/812,958

(22) Filed: Jul. 29, 2015

(65) Prior Publication Data
US 2017/0030784 A1    Feb. 2, 2017

(51) Int. Cl.
*G01L 1/22* (2006.01)
*G01L 3/14* (2006.01)

(52) U.S. Cl.
CPC .............. *G01L 1/22* (2013.01); *G01L 3/1457* (2013.01); *G01L 1/2262* (2013.01); *G01L 1/2287* (2013.01)

(58) Field of Classification Search
CPC .......................... G01L 3/1457; G01L 1/2287
USPC ...................... 73/862.045, 862.325, 862.338
See application file for complete search history.

(56) References Cited

U.S. PATENT DOCUMENTS

| | | | |
|---|---|---|---|
| 5,113,133 A * | 5/1992 | Conti | G01R 1/067 324/72.5 |
| 5,794,639 A * | 8/1998 | Einbinder | A61H 3/04 135/66 |
| 5,872,320 A | 2/1999 | Kamenster et al. | |
| 6,359,613 B1 | 3/2002 | Poole | |
| 7,020,503 B2 | 3/2006 | Wong et al. | |
| 7,094,061 B1 | 8/2006 | Kieffer et al. | |
| 7,096,748 B2 | 8/2006 | Kutlu | |
| 7,308,818 B2 * | 12/2007 | Considine | A63B 69/20 73/12.09 |
| 8,909,145 B2 | 12/2014 | Malhan et al. | |
| 9,080,932 B2 | 7/2015 | Shah et al. | |
| 2005/0081651 A1* | 4/2005 | Loher | G01G 23/48 73/862.625 |
| 2006/0021453 A1* | 2/2006 | Kutlu | G01L 5/0047 73/862.474 |
| 2008/0142352 A1* | 6/2008 | Wright | G06F 3/044 200/600 |

(Continued)

*Primary Examiner* — Max Noori
(74) *Attorney, Agent, or Firm* — Treyz Law Group, P.C.; G. Victor Treyz; Michael H. Lyons (57) ABSTRACT

A printed circuit board may have embedded strain gauges. A strain gauge may be formed from a metal trace on a polymer substrate. The metal trace may form a variable strain gauge resistor that is incorporated into a bridge circuit for a strain gauge. The printed circuit may have a rigid printed circuit layer with a recess that receives the polymer substrate. Metal pads on the polymer substrate may be coupled to respective ends of the variable strain gauge resistor. The rigid printed circuit substrate with the recess may be laminated between additional rigid printed circuit layers. Vias may be formed through the additional rigid printed circuit layers to contact the metal pads. Embedded strain gauges may be used in gathering strain data when strain is imparted to a printed circuit during use of the printed circuit in an electronic device or during testing.

20 Claims, 13 Drawing Sheets

(56) References Cited

U.S. PATENT DOCUMENTS

| | | | | |
|---|---|---|---|---|
| 2009/0263633 | A1* | 10/2009 | Liggett | B32B 15/08 |
| | | | | 428/195.1 |
| 2011/0314935 | A1* | 12/2011 | Krippner | G01L 3/1457 |
| | | | | 73/862.045 |
| 2014/0331741 | A1* | 11/2014 | Shah | G01N 3/30 |
| | | | | 73/12.06 |
| 2015/0296622 | A1* | 10/2015 | Jiang | G01L 1/2268 |
| | | | | 361/750 |

* cited by examiner

PRINTED CIRCUITS WITH EMBEDDED STRAIN GAUGES

BACKGROUND

This relates generally to strain gauges, and, more particularly, to strain gauges for monitoring strain in printed circuits.

Electronic devices such as cellular telephones, computers, and other electronic devices contain integrated circuits and other electrical components. Components such as these may be mounted on printed circuits. During drop events and other situations in which an electronic device is subjected to an impact or other conditions leading to elevated stresses, solder joints may be weakened and other faults can develop in the circuitry mounted on a printed circuit. Unless care is taken, stress-induced damage to an electrical component or other circuitry in an electronic device may create reliability issues.

To help understand the way in which strain is distributed to the components in a printed circuit, strain tests may be performed on a test printed circuit board. External strain gauges may be attached to the upper and lower surfaces of the test board in the vicinity of integrated circuits or other components of interest. These strain gauges may be wired to test equipment that gathers strain data. Strain data may be gathered with the strain gauges while applying force to the printed circuit. By analyzing the strain data, printed circuit board designs and component layouts can be refined to enhance reliability.

It can be difficult to gather accurate strain data with this type of approach. Strain measurements from strain gauges mounted on the surface of the printed circuit board may be influenced by the way in which the strain gauges are adhered to the surface of the printed circuit board and other variables that are difficult to control. These strain gauges also do not gather strain data in the field to alert a user or others about the presence of excessive strain.

It would therefore be desirable to be able to provide improved strain gauge configurations for monitoring components on printed circuit boards.

SUMMARY

A printed circuit board may have embedded strain gauges. A strain gauge may be formed from a metal trace on a polymer substrate. The metal trace may form a variable strain gauge resistor that may be incorporated into a bridge circuit for the strain gauge.

The printed circuit board may have a printed circuit board layer with a recess. The polymer substrate for the strain gauge resistor may be mounted within the recess. Metal pads on the polymer substrate may be coupled to respective ends of the variable strain gauge resistor. The rigid printed circuit substrate with the recess may be laminated between additional rigid printed circuit layers. Vias may be formed through the additional rigid printed circuit layers to contact the metal pads.

Embedded strain gauges may be used in gathering strain data when strain is imparted to a printed circuit during use of the printed circuit in an electronic device or during testing. Strain gauges may make strain measurements on solder ball joints under electrical components mounted to the printed circuit board.

DETAILED DESCRIPTION

Figure 1:
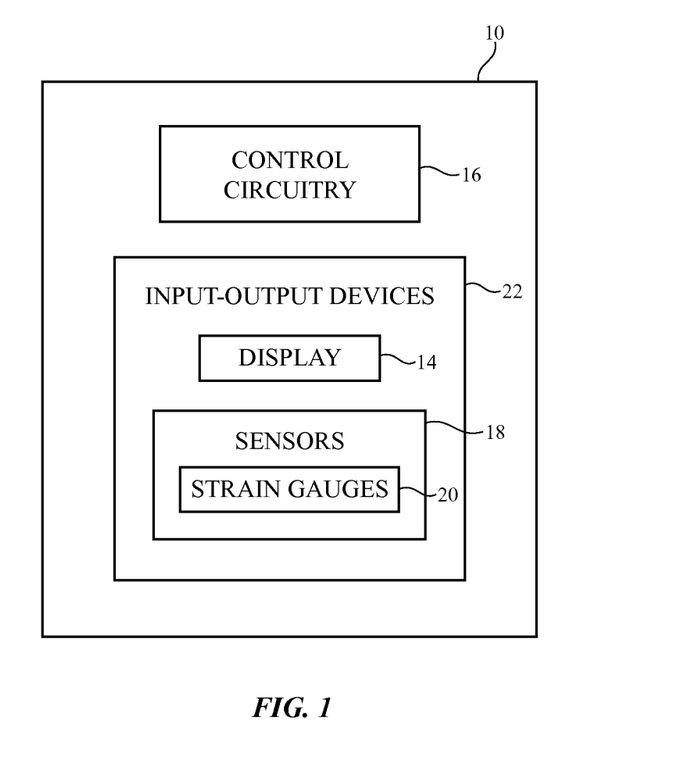
FIG. 1 is a schematic diagram of an illustrative electronic device having strain gauges for monitoring printed circuit board strain in accordance with an embodiment.

An illustrative electronic device of the type that may be provided with a printed circuit board having strain gauges is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 22 may be used to allow data to be supplied to device 10 and to allow data to be provided from device 10 to external devices. Input-output devices 22 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 22 and may receive status information and other output from device 10 using the output resources of input-output devices 22.

Input-output devices 22 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 22 may also include sensors 18. Sensors 18 may include strain gauge sensors 20 and other sensors such as proximity sensors, ambient light sensors, touch sensors, force sensors, temperature sensors, pressure sensors, magnetic sensors, and other sensors. Strain gauge sensors 20 may include sensors mounted on the surfaces of a printed circuit board and/or embedded within a printed circuit board.

Control circuitry 16 may be used to run software on device 10 such as operating system code and applications. During operation of device 10, the software running on control circuitry 16 may be used in gathering strain gauge data from embedded strain gauges and/or other strain gauges in device 10. Strain gauge data may be analyzed during failure analysis (e.g., to help designers improve the design of a device and the printed circuits and other components within the device), may be monitored in real time to issue alerts and provide other information to a user or others, and/or may be used to take other suitable action in device 10.

Device 10 may be a tablet computer, laptop computer, a desktop computer, a monitor that includes an embedded computer, a monitor that does not include an embedded computer, a display for use with a computer or other equipment that is external to the display, a cellular telephone, a media player, a wristwatch device or other wearable electronic equipment, or other suitable electronic device.

Display 14 may be an organic light-emitting diode display, a liquid crystal display, an electrophoretic display, an electrowetting display, a display based on an array of discrete crystalline light-emitting diode dies, or a display based on other types of display technology.

Figure 2:
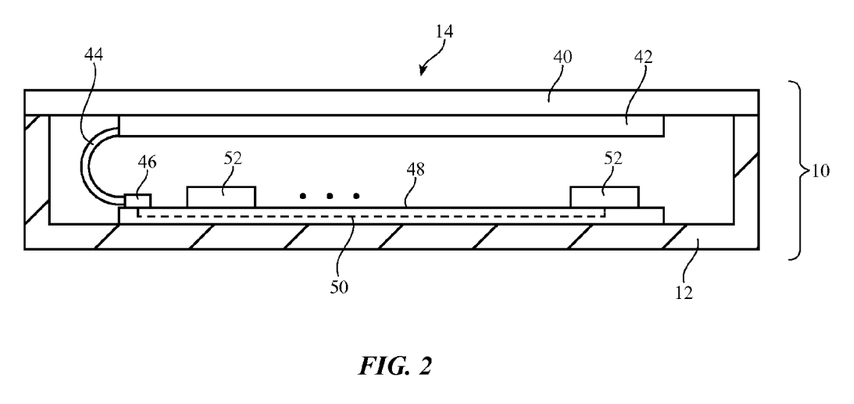
FIG. 2 is a cross-sectional side view of the illustrative electronic device in accordance with an embodiment.

A cross-sectional side view of an illustrative electronic device such as device 10 of FIG. 1 is shown in FIG. 2. As shown in FIG. 2, device 10 may have a housing such as housing 12 in which components 52 are mounted. Components 52 may include integrated circuits, connectors, sensors, input-output devices, and other circuitry. Components 52 may be mounted on one or more substrates such as illustrative substrate 48. Substrate 48 may be a printed circuit (e.g., a rigid printed circuit board formed from fiberglass-filled epoxy or other rigid printed circuit board substrate material or a flexible printed circuit formed from a flexible layer of polyimide or a sheet of other polymer material). Configurations in which substrate 48 is a rigid printed circuit board are sometimes described herein as an example.

Display 14 may include display layers 42 (e.g., liquid crystal display layers, an organic light-emitting diode display, an electrophoretic display, etc.). Display layers 42 may be mounted under display cover layer 40. Display cover layer 40 may be mounted to housing 12 and may be formed from a layer of glass, transparent plastic, sapphire or other transparent crystalline material, or other protective layer. Display layers 42 may be attached to printed circuit 48 using signal path 44. Signal path 44 may be a flexible printed circuit that is coupled to connector 46 on printed circuit 48. Metal traces 50 in printed circuit 48 may be used in forming signal interconnects for electrical components mounted to printed circuit 48 such as connector 46 and electrical components 52.

When a device such as device 10 is inadvertently dropped by a user or is otherwise subjected to a sharp impact, there is a potential for the circuitry mounted to a printed circuit such as printed circuit 48 to become damaged. For example, solder joints may develop cracks or integrated circuits or other components may come loose from the surface of printed circuit 48.

To help warn a user or others about conditions that can lead to damage and/or to help analyze printed circuit structures and other device structures so as to improve the design of these structures in a way that avoids excessive damage when a printed circuit is stressed, printed circuit 48 may be provided with one or more strain gauges. The strain gauges may gather strain data during use of device 10 by a user and/or during testing. Strain data may be analyzed to determine when excessive strain has been experienced. A warning may be issued or a log of strain data may be maintained during use of device 10. If desired, strain gauge data may be gathered when applying force to printed circuit 48 during testing of printed circuit 48 (e.g., a test version of printed circuit 48).

Figure 3:
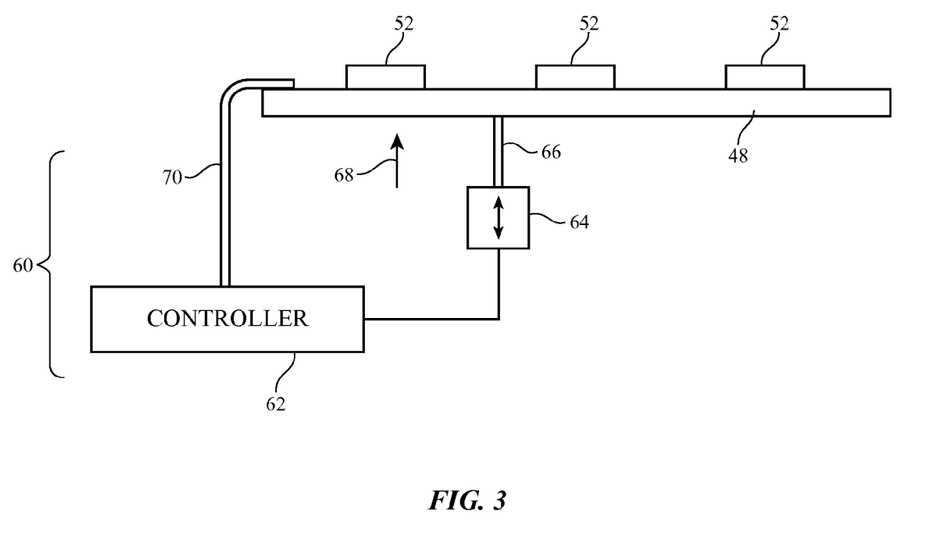
FIG. 3 is a cross-sectional side view of a printed circuit board during strain measurements in accordance with an embodiment.

As shown in FIG. 3, for example, test equipment 60 may be used in gathering strain data on board 48 during stress tests. Test equipment 60 may include a controller such as controller 62 (e.g., one or more microprocessors, one or more computers, and/or other processing equipment). Controller 62 may control the operation of an actuator such as positioner 64 (e.g., a linear electromagnetic actuator or other electrically controlled device for applying force to an object). Positioner 64 may press member 66 against printed circuit 48 (e.g., by moving member 66 in direction 68 during stress testing). Strain may also be induced in board 48 using ball drop tests and other strain-inducing actions.

Board 48 may be provided with one or more strain gauges. Controller 62 may be coupled to the strain gauges using a signal path such as cable 70 and traces 50 in printed circuit board 48. Using this signal path, controller 62 may gather strain data from the strain gauges of printed circuit 48 during testing. Controller 62 (and/or other equipment) may then perform failure analysis on the test data. Based on this analysis, design features can be redesigned to ensure that the printed circuit 48 will exhibit enhanced robustness and to ensure that components 52 will have a reduced likelihood of becoming damaged when board 48 is used in device 10 in the field.

Figure 4:
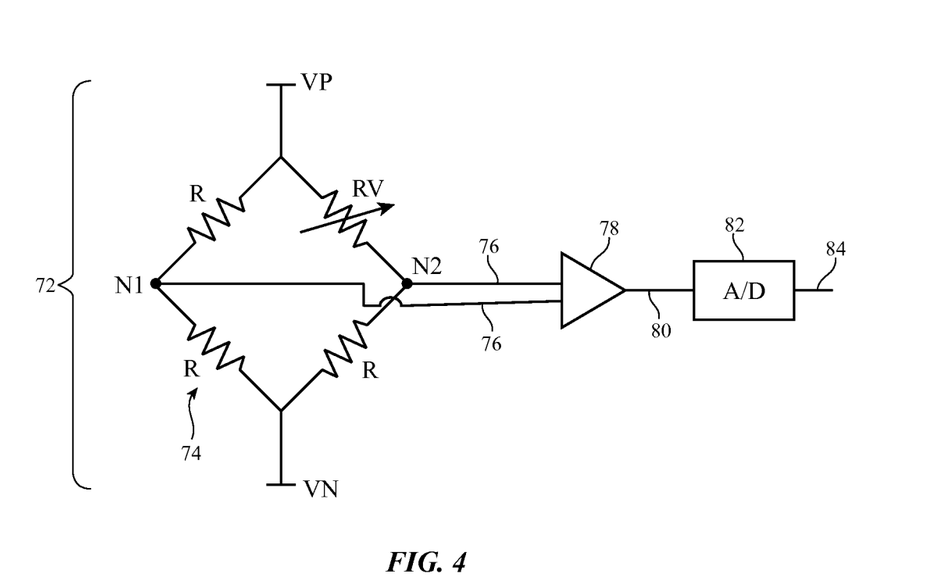
FIG. 4 is a circuit diagram of illustrative strain gauge circuitry in accordance with an embodiment.

FIG. 4 is a circuit diagram of illustrative strain gauge circuitry of the type that may be used to form strain gauges 20 in printed circuit board 48 that gather strain data. Strain gauge circuitry 72 may include a bridge circuit (e.g., a Wheatstone bridge) such as bridge circuit 74. Bridge circuit 74 may include reference resistors R and variable resistor (strain gauge resistor RV). The resistance of resistor RV may vary as a function of applied strain and therefore serves as a strain sensing element. The illustrative bridge circuitry of FIG. 4 includes one strain sensing variable resistor RV and three reference resistors R, but configurations with two variable resistors RV and two reference resistors R or other combinations of variable and fixed resistors may be used, if desired.

Power supply terminals VP and VN may respectively apply a positive power supply voltage and ground power supply voltage to bridge circuit 74. Signal lines 76 may be used to measure voltages at measurement nodes N1 and N2 of circuit 74. Differential amplifier 78 may receive the voltages on nodes N1 and N2 via lines 76 and may produce a corresponding analog strain gauge output signal (strain data) on output line 80. Analog-to-digital converter 82 may convert the analog strain gauge signal on line 80 to a digital strain gauge signal on output 84. In a testing configuration of the type shown in FIG. 3, strain data from output 84 may be received by controller 62. In operation in device 10, strain data from output 84 may be maintained in storage within control circuitry 16. Strain data in control circuitry 16 may be used by control circuitry 16 (e.g., to generate alerts, etc.) and/or may be provided to external equipment such as controller 62 or other external computing equipment (e.g., to allow service personnel to perform diagnostics, to allow failure analysis operations to be performed, etc.).

Figure 5:
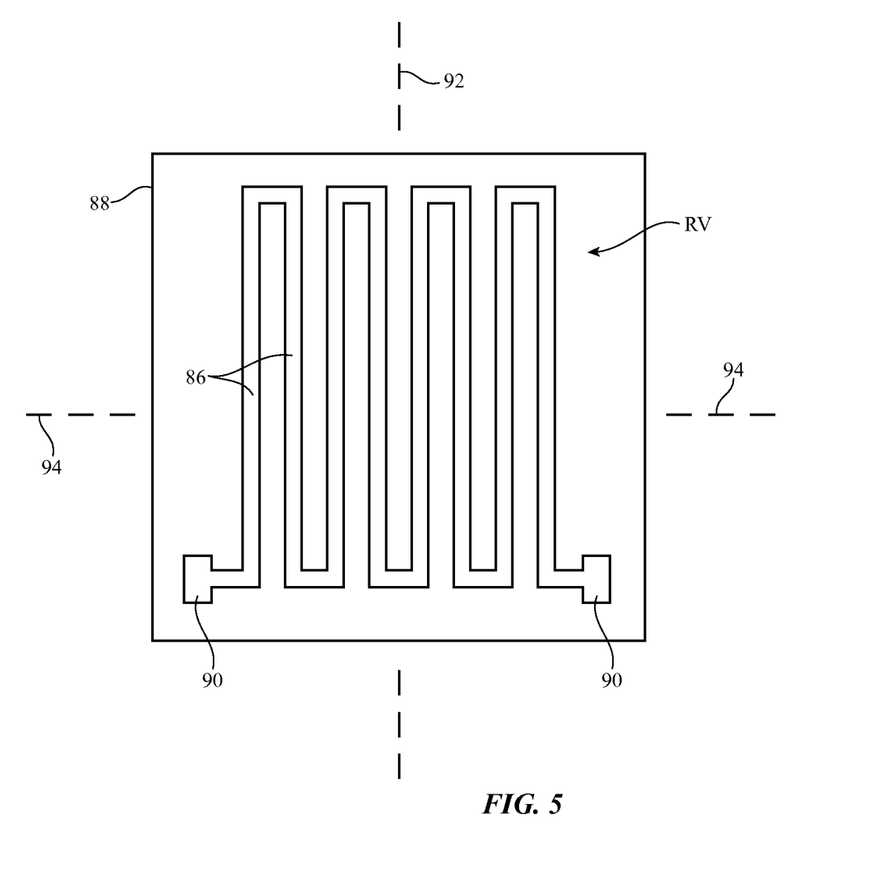
FIG. 5 is a top view of an illustrative variable resistor of the type that may be used in a strain gauge in accordance with an embodiment.

An illustrative strain gauge resistor such as resistor RV of FIG. 4 is shown in FIG. 5. As shown in FIG. 5, resistor RV may have an elongated metal trace 86 with a meandering path. Trace 86 may be formed from a metal such as nichrome, constantan, or other metals (elemental metals or metal alloys). Trace 86 may have a series of interconnected segments that run parallel to axis 92 and may be supported by a substrate such as substrate 88. Substrate 88 may be plastic or other dielectric. For example, substrate 88 may be formed from a sheet of polyimide or other flexible polymer. The resistance of trace 86 (and therefore the resistance of resistor RV) may be measured across terminals such as contact pads 90 at opposing ends of trace 86. When resistor RV is bent about axis 94, trace 86 will become thinner and elongated, increasing the resistance of resistor RV. In this way, resistor RV can serve as a strain sensing element for strain sensor circuitry 72 of FIG. 4. If desired, multiple strain sensing resistors (e.g., two, three, more than three, etc.) may be mounted on a single substrate such as substrate 88.

Figure 6:
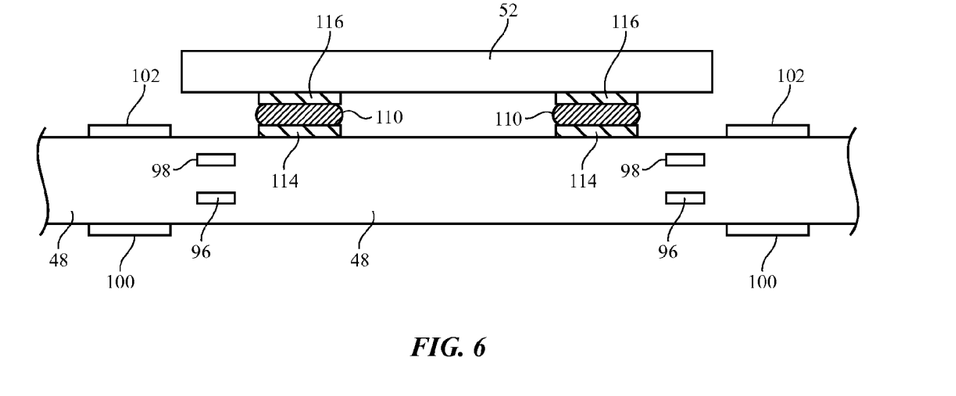
FIG. 6 is a cross-sectional side view of a portion of a printed circuit showing illustrative printed circuit locations for strain gauges in accordance with an embodiment.
Figure 8:
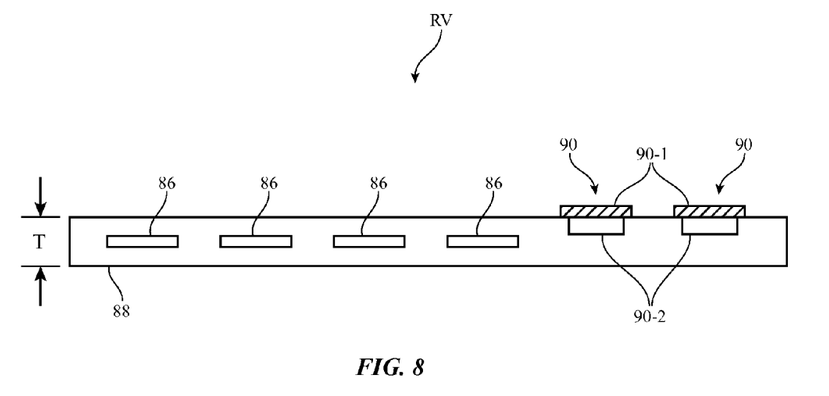
FIG. 8 is a cross-sectional side view of an illustrative strain gauge structure formed from a metal trace in a polymer substrate in accordance with an embodiment.

FIG. 6 is a cross-sectional side view of printed circuit 48 showing illustrative locations where strain gauges can be incorporated into printed circuit 48. As shown in FIG. 8, one or more components such as component 52 may be soldered to printed circuit 48. Printed circuit 48 may have traces that form contacts such as solder pads 114. Component 52 may have mating contacts such as contacts 116. Solder 110 may be used to solder component 52 to printed circuit 48 (i.e., solder balls formed from solder 110 may be used to solder contacts 116 to contacts 114). This type of arrangement may be used to form an array of solder balls (e.g., a ball grid array when component 52 has a ball grid array package) or other suitable solder joint pattern. In general, any suitable components may be mounted on printed circuit 48 (e.g., components mounted in land grid array (LGA) packages, other types of surface mount technology (SMT) packaging, integrated circuits in chip-scale packages (CSP), etc.). Configuration in which solder balls form joints for ball grid array packages are merely illustrative.

When subjected to strain, there is a risk that solder joints such as solder joints formed from solder 110 of FIG. 6 may become damaged. Accordingly, it may be desirable to locate strain gauges on printed circuit 48 at locations where the strain experienced by the solder balls can be measured (e.g., at certain selected solder balls). As an example, external strain gauges can be mounted on the top of printed circuit 48 in locations such as locations 102 or on the bottom of printed circuit 48 in locations such as locations 100 (i.e., on the side of printed circuit 48 opposing the side of printed circuit 48 on which component 52 is mounted). Strain gauges may also be embedded within printed circuit 48 in locations such as locations 98 and 96. Locations such as locations 98 are closer to the surface of printed circuit 48 on which component 52 are mounted and therefore may provide strain data of enhanced accuracy. The depth at which the strain gauges may be buried below the surface of printed circuit 48 may be 10-100 microns, more than 5 microns, less than 200 microns, less than 40 microns, or other suitable depth. The strain sensor circuitry that is embedded within printed circuit 48 may include variable resistors such as variable resistor RV and, if desired, circuitry of the type shown in FIG. 4 (e.g., a Wheatstone bridge). Configurations in which the strain sensor embedded within printed circuit 48 includes variable resistor RV are sometimes be described herein as an example.

Figure 7:
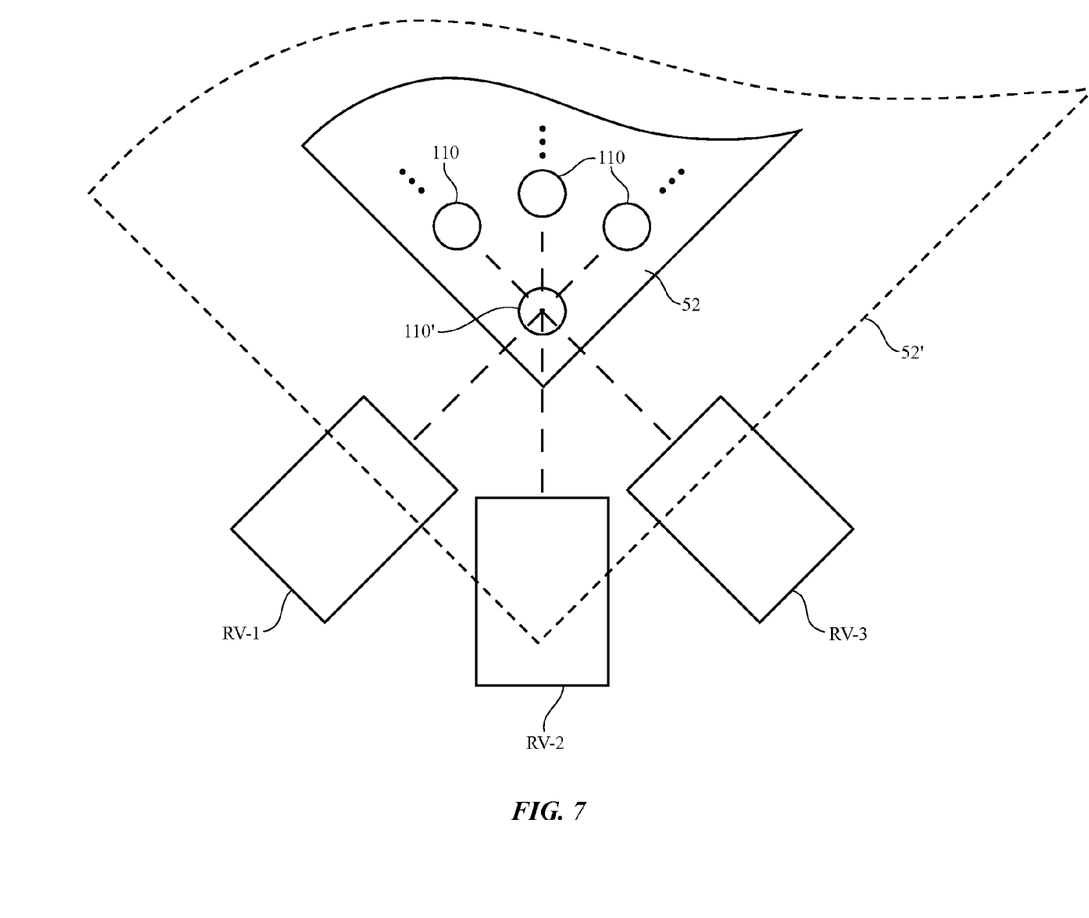
FIG. 7 is a top view of an illustrative pattern of strain gauges that may be used to monitor strain on a solder ball joint or other structure on a printed circuit in accordance with an embodiment.

FIG. 7 is a top view of component 52 showing how solder balls 110 may be patterned in an array (as an example). In this type of situation, corner ball 110' may be more susceptible to damage than other balls because corner ball 110' receives less support from surrounding solder balls than solder balls that are surrounded by solder balls on all sides. Using an array of three strain sensing resistors RV (e.g., resistors RV-1, RV-2, and RV-3, which are each angularly offset by 45° with respect to the next) that are pointed at corner solder ball 110', the strain experienced by corner solder ball 110' may be accurately monitored. Resistors RV-1, RV-2, and RV-3 may be formed on individual polymer substrates or may be formed on a common polymer substrate. Other strain resistor deployment patterns may be used when monitoring solder ball strain for component 52, if desired. The example of FIG. 7 is merely illustrative. The package of component 52 may overlap some or all of strain gauge resistors RV-1, RV-2, RV-3, as illustrated by dashed component outline 52'. Strain gauge resistors RV-1, RV-2, and RV-3 may be embedded within the layers that make up printed circuit 48.

FIG. 8 is a cross-sectional side view of an illustrative strain gauge resistor such as variable resistor RV of FIG. 5. As shown in FIG. 8, variable resistor RV may have a metal resistor trace 86 supported by substrate 88. Substrate 88 may be a polymer such as polyimide or other dielectric. The thickness T of substrate 88 may be less than 50 microns, less than 20 microns, less than 5 microns, or less than 2 microns. Metal trace 86 may have a thickness of less than 1 micron, less than 0.5 microns, less than 0.2 microns, or other suitable thickness. Metal trace 86 may have a series of parallel segments coupled in series to form a resistor with opposing ends coupled to pads 90. Pads 90 may have metal structures such as nickel structures 90-2, copper structures 90-1, or structures formed from other metals. Metal trace 86 may be formed on the surface of substrate 88 or within substrate 88, as shown in FIG. 8. With one illustrative arrangement, pads 90 are configured to form terminals for variable resistor RV and serve as a laser drilling stopping layer. This allows laser drilling operations to be used to form printed circuit via holes that terminate on pads 90 after resistor RV has been embedded within the layers of printed circuit 48.

Figure 9:
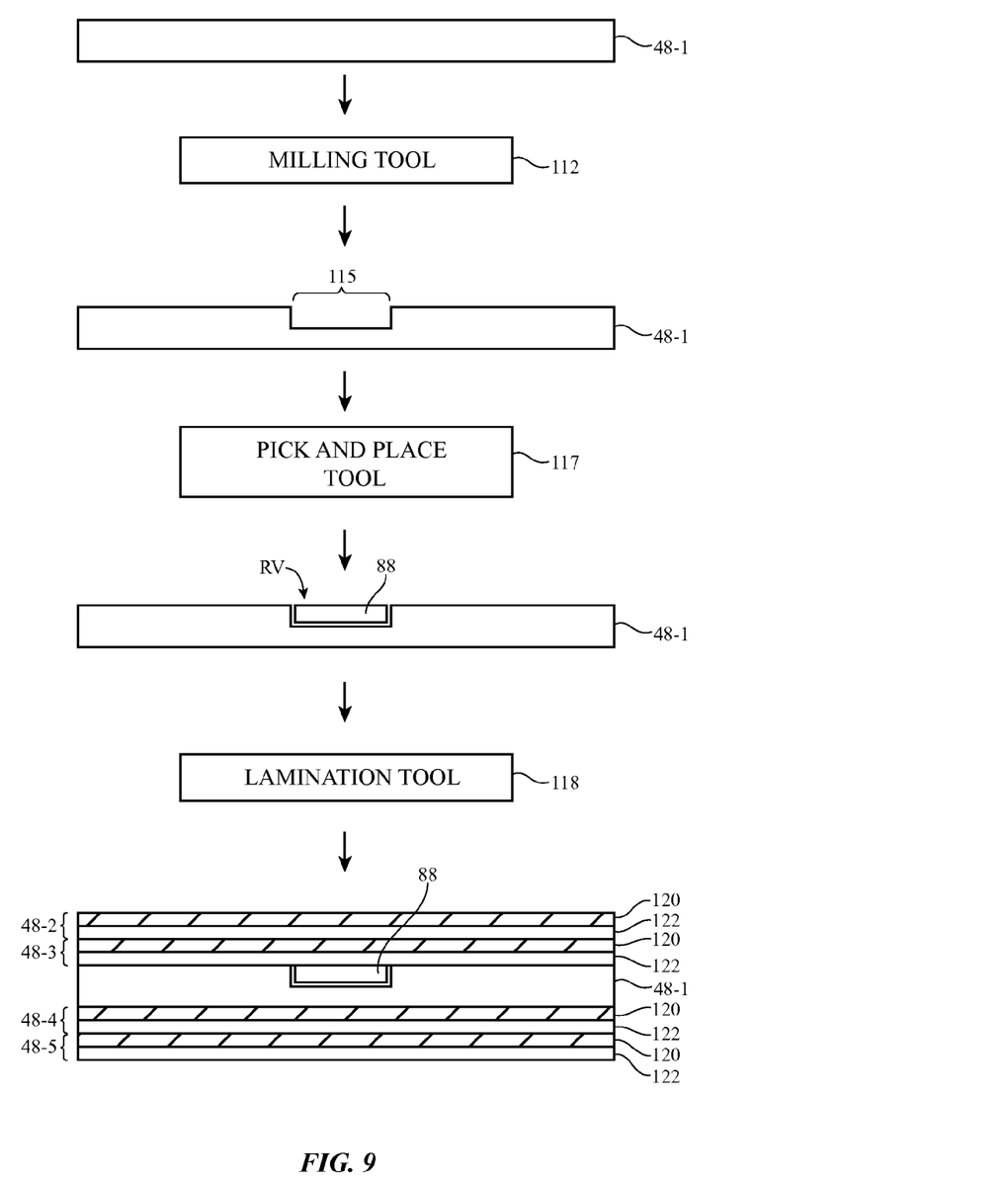
FIGS. 9 and 10 are diagrams of illustrative equipment and operations involved in embedding strain gauge circuitry in a printed circuit in accordance with an embodiment.
Figure 10:
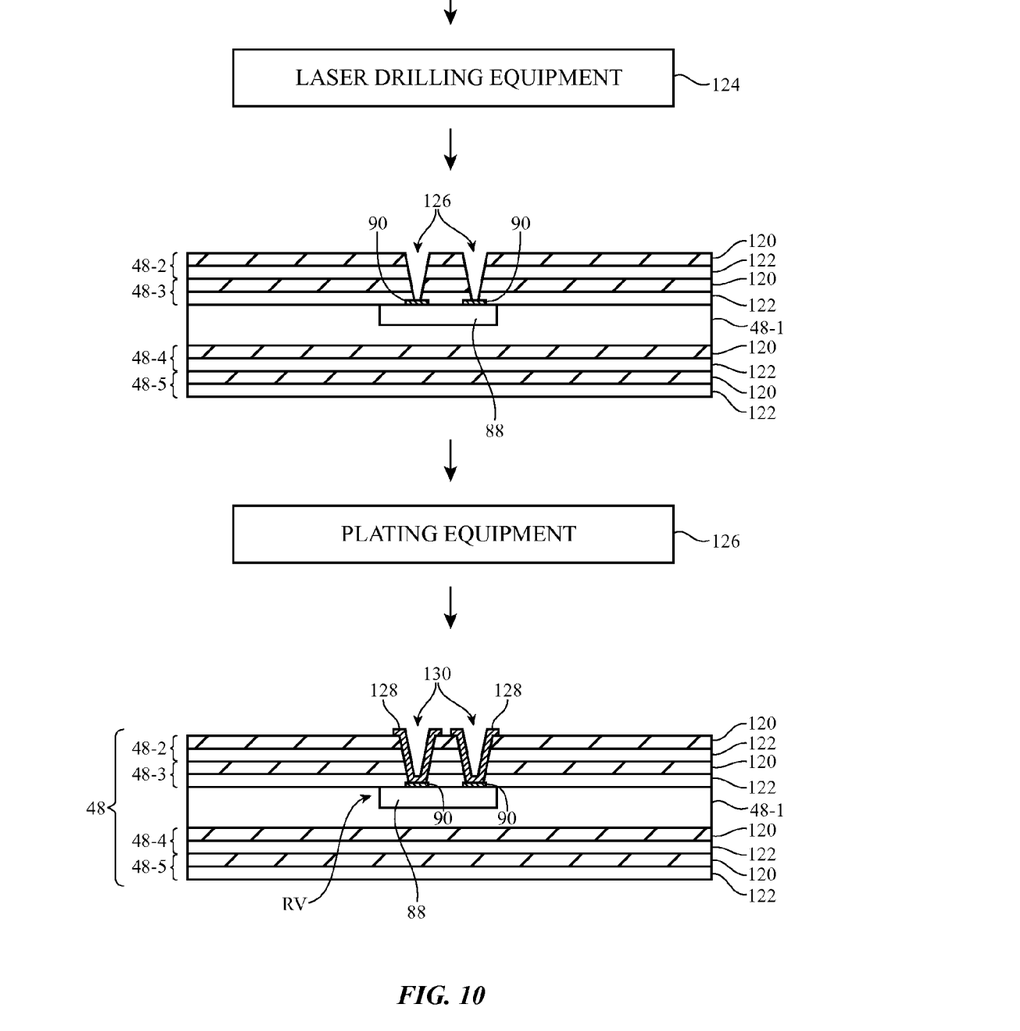

Illustrative equipment and operations in forming printed circuits with embedded strain sensors are shown in FIGS. 9 and 10. As shown in FIG. 9, milling tool 112 or other equipment may form recess 115 in printed circuit layer 48-1. Printed circuit layer 48-1 may be a layer of rigid printed circuit board material (e.g., fiberglass-filled epoxy material) such as a layer of FR4 printed circuit board material.

After forming recess 115 in printed circuit layer 48-1, pick and place tool 117 or other robotic assembly equipment may be used to place variable resistor RV on substrate 88 in recess 115. Lamination tool 118 may then use heat and pressure to attach additional printed circuit layers such as layers 48-2, 48-3, 48-4, and 48-5 to the upper and lower surfaces of printed circuit layer 48-1. Layers 48-2 may be rigid printed circuit board layers that include patterned metal traces (e.g., copper traces) such as metal traces 120 on rigid printed circuit board material 122 (e.g., FR4). Adhesive may be used between adjacent layers during printed circuit lamination operations. Any suitable number of printed circuit layers may be laminated together, if desired. The operations of FIG. 9 in which four printed circuit layers have been laminated to layer 48-1 (two layers above layer 48-1 and two layer below layer 48-1) is merely illustrative.

As shown in FIG. 10, after laminating the printed circuit layers together, laser drilling equipment 124 or other suitable via formation equipment may be used to form via holes 126. Equipment 124 may be a pulsed or continuous wave laser operating in the visible spectrum, infrared spectrum, or ultraviolet light spectrum. For example, laser drilling equipment 124 may be a Nd:YAG laser. The laser light from equipment 124 may penetrate through the metal and dielectric of layers 48-2 and 48-3 to reach pads 90 and thereby expose pads 90 without penetrating through pads 90.

After forming via holes 126, plating equipment 126 or other metal deposition equipment may be used to form metal 128 in via holes 126, thereby forming vias 130. Contact pads may be formed from metal layer 120. These contact pads may be coupled to vias 130, thereby allowing terminals 90 of sensor resistor RV to be electrically accessed at the surface of printed circuit 48. Sensor signal processing circuitry such as amplifier 78 and analog-to-digital converter circuitry 82 may be interconnected with vias 130 and/or other sensor circuitry 72 using traces 50 in printed circuit 48. Circuitry such as reference resistors R (e.g., bridge circuit 74) may be formed on the same substrate (e.g., substrate 88) as variable resistor(s) RV or reference resistors R may be formed elsewhere on printed circuit 48 or external to circuit 48. After forming printed circuit 48 of FIG. 10, components 52 may be mounted on printed circuit 48 (e.g., using pick and place equipment, a solder reflow oven, and/or other component mounting techniques). Printed circuit 48 may then be used as a test board in a test setup of the type shown in FIG. 3 or may be installed into device 10 and used in the field.

Figure 11:
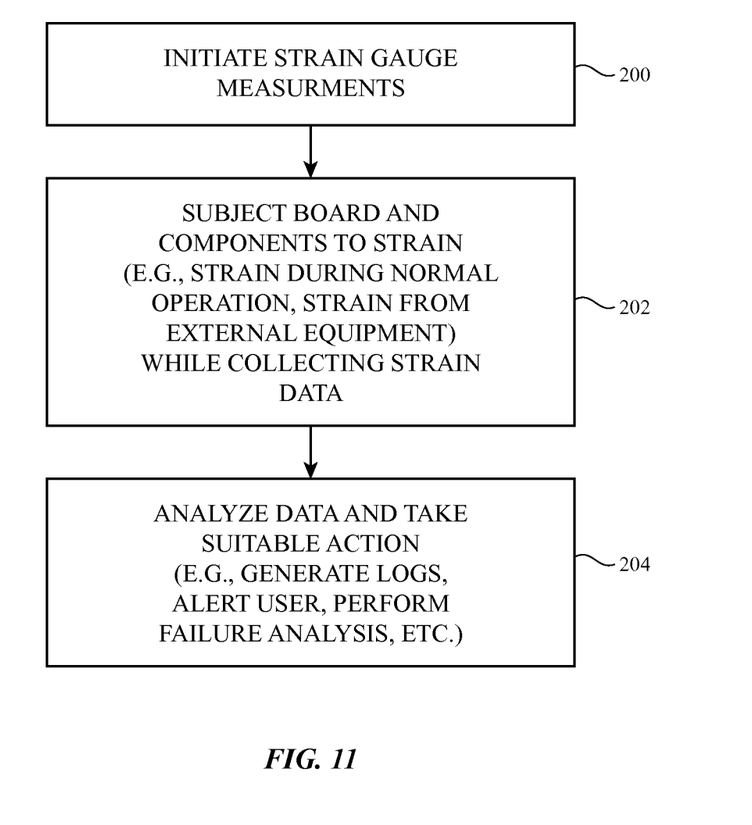
FIG. 11 is a flow chart of illustrative steps involved in gathering and analyzing strain gauge data on a printed circuit and in taking suitable action in accordance with an embodiment.

Illustrative steps involved in using strain gauge circuitry 72 (e.g., embedded strain sensors 20, etc.) are shown in FIG. 11.

At step 200, strain gauge measurements may be initiated. For example, in a test system of the type shown in FIG. 3, controller 62 may direct one or more strain gauges 20 to use circuitry such as strain gauge circuitry 72 of FIG. 4 to collect strain data. The strain gauges may be mounted on the exterior surfaces of printed circuit board 48 and/or may be embedded within printed circuit board 48. Controller 62 may be coupled to board 70 (and thereby the strain sensor circuitry) using a cable such as cable 70 of FIG. 3 or using test probes (as examples). If desired, control circuitry 16 that is mounted in an electronic device housing with printed circuit 48 may direct strain gauge(s) 20 to initiate strain data measurements (e.g., based on user input, based on sensor data such as data from an accelerometer indicating that device 10 has been dropped, based on a predetermined schedule, or based on satisfaction of other suitable criteria).

At step 202, printed circuit 48 (either a test printed circuit in the test system of FIG. 3 or a printed circuit board that has been assembled with other structures to form device 10) may be used to gather strain data from strain gauges 20 (e.g., strain sensors mounted on the surface of board 48 and/or strain sensors mounted within the layers of printed circuit 48 such as a strain sensor based on variable resistor RV on substrate 88) while printed circuit board 48 is subjected to strain (e.g., strain induced by a test system, strain from normal wear and tear on device 10, strain imparted to board 48 due to a drop event in which device 10 is dropped on the ground or is otherwise subjected to a sharp impact, etc.). Strain data may be stored in controller 62 and/or control circuitry 16 of device 10 or other electronic equipment.

At step 204, the strain data that has been gathered at step 202 may be analyzed and appropriate action taken in response. As an example, test data gathered using controller 62 may be analyzed as part of a failure analysis operation that seeks to understand how to improve the design of printed circuits such as printed circuit 48, how to improve the mounting of components 52, and/or how to make other design enhancements. As another example, strain data may be analyzed by control circuitry 16. Control circuitry 16 may, as an example, compare measured strain data to predetermined thresholds to determine whether to issue an alert. If device 10 is subjected to more than a given amount of strain, control circuitry 16 may use display 14 or another output device to issue a warning to a user of device 10 (e.g., a message may be presented to a user suggesting that device 10 be serviced by a technician). As another example, a user may be presented with a warning message that serves as a reminder to treat device 10 with care (e.g., "caution, you may risk damage to your device by dropping your device repeatedly"). Strain data may be logged and retrieved at a later time by computing equipment in a service facility. For example, strain data may be analyzed to determine whether certain components should be repaired or replaced, to determine how device 10 has been handled, etc.

Figure 12:
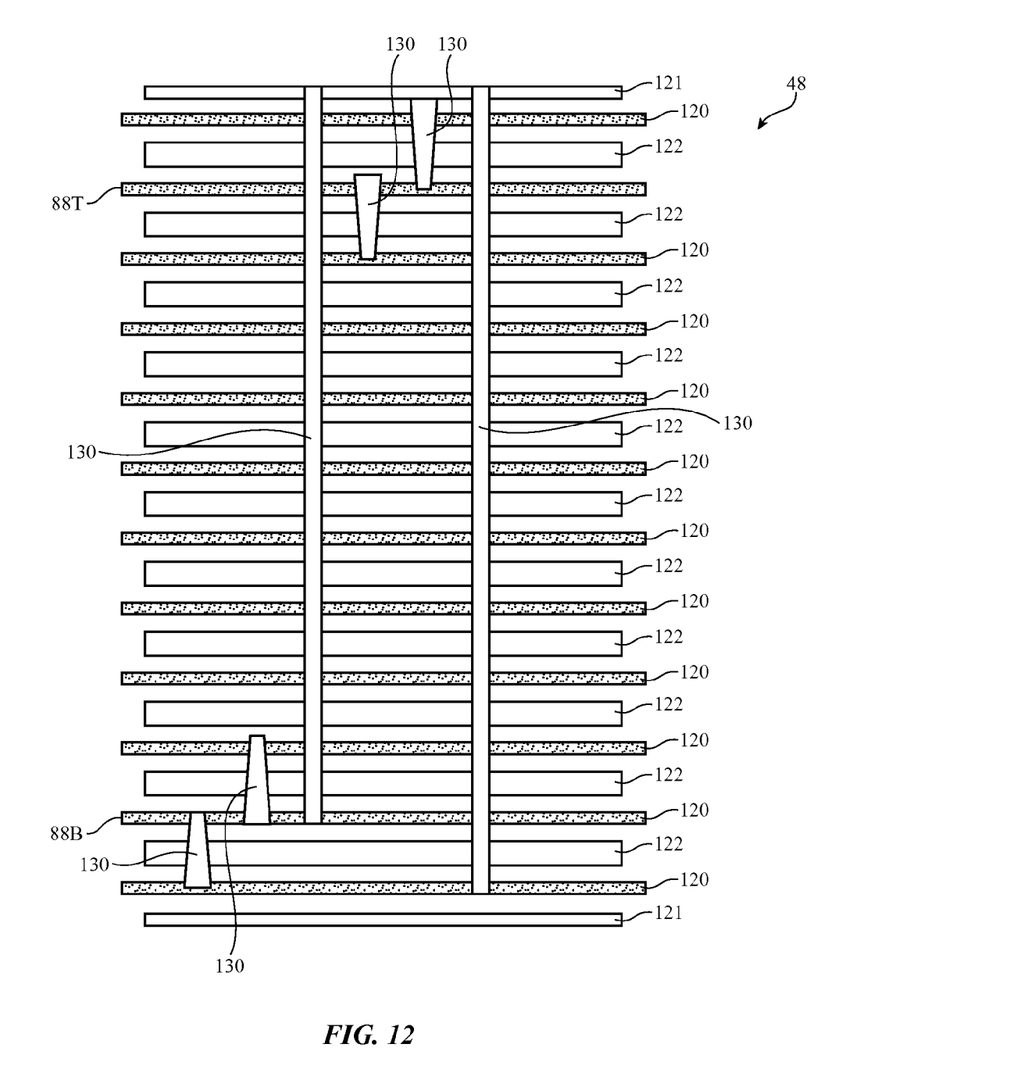
FIG. 12 is a cross-sectional side view of illustrative printed circuit board showing how strain gauge circuitry may be mounted in layers near the top or bottom of the printed circuit board in accordance with an embodiment.

To make sensitive strain gauge measurements, it may be desirable to locate strain gauges near the upper and/or lower layers of board 48, where stresses tend to be maximized. FIG. 12 is a cross-sectional side view of an illustrative printed circuit board with strain gauge substrates 88T and 88B that are respectively located in the second from the top and second from the bottom layers of printed circuit 48. Printed circuit 48 has multiple metal layers 120 (e.g, copper layers) and dielectric layers 122. Solder mask layers 121 may be formed on the surface of the outermost metal layers 120.

Figure 13:
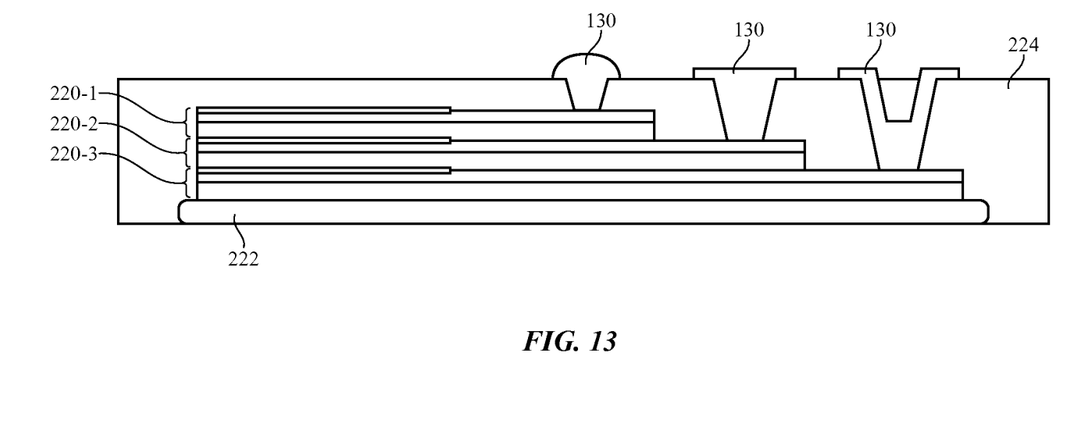
FIG. 13 is a cross-sectional side view of a rosette (stacked) style strain gauge structure.

If desired, measurements of strain in printed circuit 48 may be made using a rosette (stacked) style gauge. This type of arrangement is shown in FIG. 13, in which a stacked strain gauges 220-1, 220-2, and 220-3 are embedded within dielectric 224 on substrate 222. Vias 130 may allow signals to be routed to and from gauges 220-1, 220-2, and 220-3. The structures of FIG. 13 may form all or part of a printed circuit. For example, the structures of FIG. 13 may form a stacked strain gauge that is embedded within one or more layers of printed circuit 48 of FIG. 6 or printed circuit 48 of FIG. 12 (as examples).

The foregoing is merely illustrative and various modifications can be made by those skilled in the art without departing from the scope and spirit of the described embodiments. The foregoing embodiments may be implemented individually or in any combination.

What is claimed is:
1. Apparatus, comprising:
    a strain gauge formed from a strain sensor substrate containing at least one strain sensor variable resistor; and
    a printed circuit board having a plurality of printed circuit layers, wherein the plurality of printed circuit layers comprises a dielectric layer with a recess that receives the strain sensor substrate.
2. The apparatus defined in claim 1 wherein the strain sensor substrate has contact pads and wherein the printed circuit board has vias that respectively contact the contact pads.

3. The apparatus defined in claim 2 further comprising:
an electrical component soldered to the printed circuit using at least one solder joint, wherein the strain gauge measures strain in the printed circuit at the solder joint.

4. The apparatus defined in claim 3 further comprising control circuitry that gathers strain data from the strain gauge.

5. The apparatus defined in claim 4 wherein the control circuitry stores the strain data while the printed circuit board is subjected to strain during use of the apparatus.

6. The apparatus defined in claim 5 further comprising:
a display; and
a housing in which the display, the control circuitry, and the printed circuit board are mounted.

7. The apparatus defined in claim 6 wherein the strain sensor substrate comprises a polymer layer and wherein the strain sensor variable resistor comprises a metal trace supported by the polymer layer.

8. The apparatus defined in claim 7 wherein the metal trace has ends that are coupled respectively to the contact pads.

9. The apparatus defined in claim 8 wherein the control circuitry stores the strain data while the printed circuit board is subjected to strain.

10. The apparatus defined in claim 3 further comprising:
test equipment that imparts strain to the printed circuit board while gathering strain data from the strain gauge.

11. The apparatus defined in claim 10 wherein the test equipment comprises:
an actuator that presses against the printed circuit board to impart the strain; and
a controller that controls the actuator while receiving the strain data.

12. An electronic device, comprising:
an electronic device housing;
a printed circuit board in the housing, wherein the printed circuit board includes a dielectric layer having a recess;
electrical components mounted on the printed circuit board; and
a strain gauge formed from a strain sensor resistor on a substrate, wherein the substrate is located within the recess.

13. The apparatus defined in claim 1 wherein the dielectric layer has first and second opposing surfaces and the recess extends from the first surface through the dielectric layer to a location between the first and second opposing surfaces.

14. The electronic device defined in claim 12 wherein the printed circuit comprises a plurality of printed circuit board layers, the electronic device further comprising vias that pass through at least one of the plurality of printed circuit board layers and that contact the strain sensor resistor.

15. The electronic device defined in claim 12 further comprising control circuitry that receives strain data from the strain gauge.

16. The electronic device defined in claim 15 wherein the electrical components include at least one component mounted to the printed circuit board using a solder ball and wherein the strain gauge measures the strain data in the printed circuit board at the solder ball.

17. The electronic device defined in claim 16 wherein the strain sensor resistor is one of a plurality of strain sensor resistors embedded within the printed circuit board each of which is oriented at a different respective angle and each of which is configured to make strain measurements at the solder ball.

18. A printed circuit board, comprising:
a rigid dielectric printed circuit board layer having a recess;
a flexible polymer strain sensor substrate mounted in the recess;
a metal trace supported by the flexible polymer strain sensor substrate that forms a strain gauge variable resistor; and
a plurality of additional rigid printed circuit board layers laminated above and below the rigid dielectric printed circuit board layer that has the recess.

19. The printed circuit board defined in claim 18 further comprising:
vias that pass through at least one of the additional rigid printed circuit board layers and that are electrically connected to the metal trace.

20. The printed circuit defined in claim 19 wherein the strain gauge variable resistor is a first strain gauge variable resistor in a set of three strain gauge variable resistors on the flexible polymer strain sensor substrate.

* * * * *

UNITED STATES PATENT AND TRADEMARK OFFICE
CERTIFICATE OF CORRECTION

| | | |
|---|---|---|
| PATENT NO. | : 9,593,991 B2 | Page 1 of 1 |
| APPLICATION NO. | : 14/812958 | |
| DATED | : March 14, 2017 | |
| INVENTOR(S) | : Anne M. Mason et al. | |

It is certified that error appears in the above-identified patent and that said Letters Patent is hereby corrected as shown below:

In the Drawings

Sheet 10, Fig. 10, the reference numeral applied to the plating equipment should read --127--.

In the Specification

In Column 7, Line 17, "plating equipment 126" should read --plating equipment 127--.

Column 7, Line 48, "board 70" should read --board 48--.

In the Claims

In Claim 20, Line 1, "printed circuit" should read --printed circuit board--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*